Jan. 7, 1969   W. STUMPE   3,420,145
FLUID PRESSURE SERVOMOTOR
Filed Oct. 9, 1967
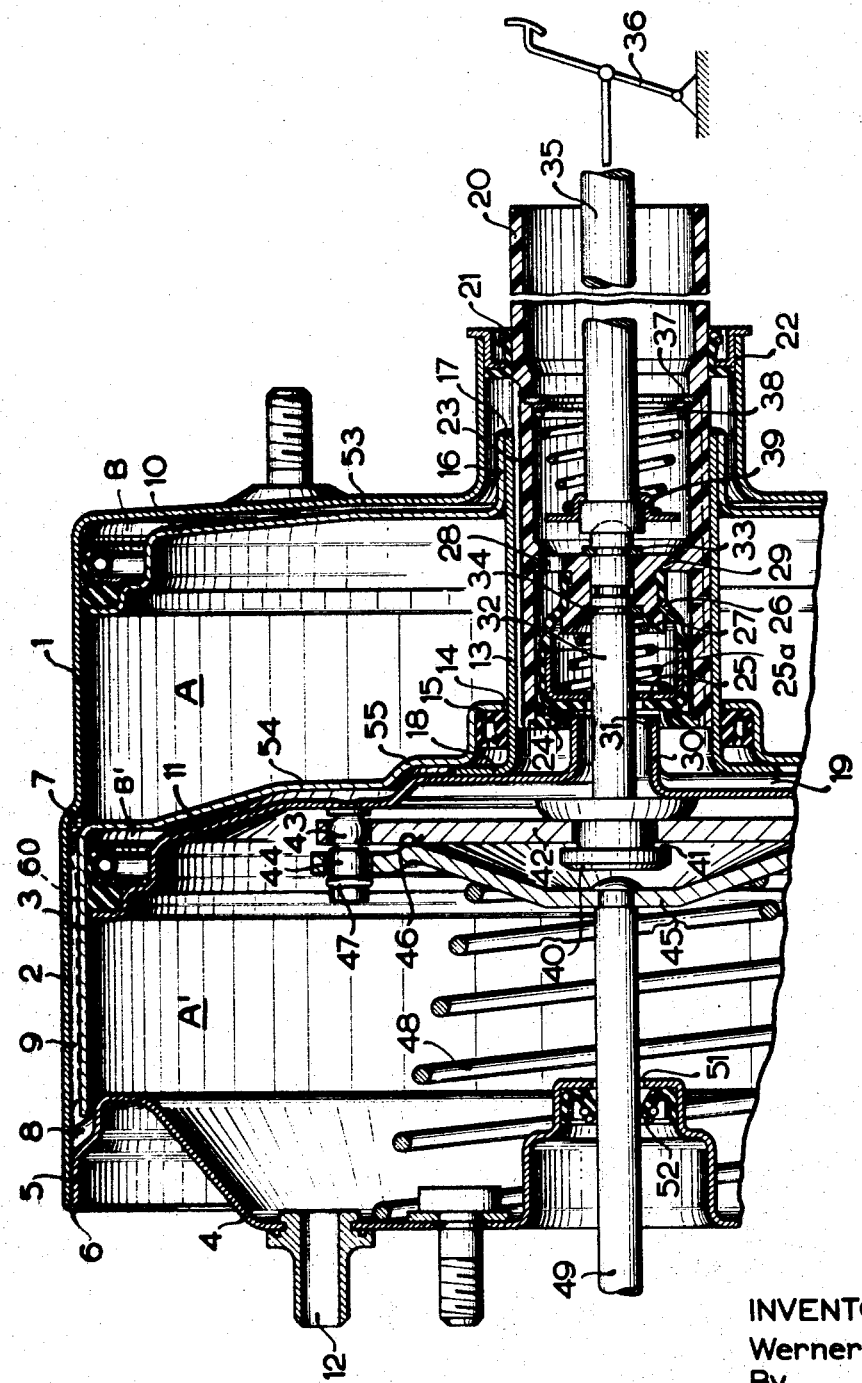
INVENTOR
Werner STUMPE
By
Michael S. Striker
his ATTORNEY United States Patent Office 3,420,145
Patented Jan. 7, 1969

1

3,420,145
FLUID PRESSURE SERVOMOTOR
Werner Stumpe, Ditzingen, Germany, assignor to
Robert Bosch G.m.b.H., Stuttgart, Germany
Filed Oct. 9, 1967, Ser. No. 673,855
Claims priority, application Germany, Oct. 14, 1966,
B 89,355
U.S. Cl. 91—376                  10 Claims
Int. Cl. F15b 9/10; F01b 19/02

ABSTRACT OF THE DISCLOSURE

A fluid pressure servomotor for braking systems of automotive vehicles which is actuated by means of vacuum-to-atmospheric pressure differential. Its shell comprises two cylinders one of which accommodates the other thereof and defines a first channel which connects the two vacuum chambers. Each cylinder accommodates a piston whose configuration conforms to that of the bottom wall of the respective cylinder to reduce the volume of second chambers which can be connected to atmosphere in response to opening of the control valve. The second chambers are connected to each other by a second channel which extends through a hub having ends welded to the pistons and cooperating with the casing of the control valve to restrict the effective cross-sectional area of the second channel so that it corresponds to the maximum cross-sectional area of the path in which the fluid can flow into the second chambers when the control valve is fully open.

Background of the invention

The present invention relates to fluid pressure servomotors, and more particularly to improvements in servomotors which are operated by means of vacuum-to-atmospheric pressure differential and can be used to transmit force to braking systems of automotive vehicles.

French Patent No. 1,372,524 discloses a servomotor serving to operate the braking system of an automotive vehicle and comprising two cylinders each of which accommodates a piston. The pistons are secured to a hub by means of a distancing sleeve which surrounds the hub with clearance and provides an annular channel which connects one chamber of one cylinder with one chamber of the other cylinder. The other chambers of the two cylinders (namely, those chambers wherein the pressure rises when the servomotor is to operate the braking system) are connected to each other by an annular second channel defined by the shell of the servomotor and extending along the periphery of one of the cylinders. Since the diameters of the cylinders are large and since the length of the second channel at least equals the maximum stroke of the pistons, the volume of the second channel is very large, especially when compared with the volume of other chambers in the idle position of pistons. Consequently, the servomotor becomes effective with a certain delay following actuation of the control valve because the second channel must be filled with pressure medium when the operator wishes to bring about a braking action.

U.S. Patent No. 3,146,682 discloses a somewhat improved servomotor wherein those chambers that can be connected with the atmosphere communicate with each other through an annular channel which is adjacent to the periphery of the shell but has a relatively small volume. However, the application of brakes again occurse with a certain delay because one of the chambers which communicate with the second channel is very large, even in

2 idle position of the pistons. Moreover, the narrow second channel is likely to be clogged by solid matter which enters with air when the operator applies the brakes.

Another servomotor for braking systems is disclosed in U.S. Patent No. 2,642,165. Two chambers of this servomotor are in permanent communication with the atmosphere and are connected to each other by an annular channel defined by two cylindrical sections of the shell. Two valves control the flow of air to and from a single vacuum chamber which results in delayed application of braking force. Moreover, the servomotor is expensive because it requires two valves and the forces generated by such servomotor cannot be regulated with requisite precision.

Summary of the invention

It is an object of my invention to provide a servomotor which is actuated by means of vacuum-to-atmospheric pressure differential and comprises a tandem piston vacuum submerged unit which can react without delay as soon as the operator decides to actuate a single control valve.

Another object of the invention is to provide a servomotor wherein the combined volume of the chambers which can communicate with the atmosphere and of the channel which connects these chambers is very small when the pistons assume their idle positions.

A further object of the invention is to provide a servomotor whose shell, pistons and other components consist of simple and inexpensive parts.

An additional object of the invention is to provide a novel coupling between the pistons of the improved servomotor and to provide the servomotor with novel pistons which can cooperate with the corresponding cylinders to keep the volume of air-receiving chambers to a minimum when the servomotor is idle.

The improved servomotor comprises a housing or shell including a series of coaxial cup-shaped cylinders having preferably slightly conical bottom walls, pistons provided in the cylinders to divide the interior of each cylinder into a vacuum chamber and a second chamber which is connectable to the atmosphere, a first channel surrounding one of the cylinders and establishing permanent communication between the vacuum chambers, a hollow tubular coupling which connects the pistons and cooperates with the casing of a control valve to define a second channel which connects the second chambers, and a valve closure member received in the casing and movable into and away from sealing engagement with a seat on one of the pistons to respectively close and open a path wherein fluid can flow between the vacuum chambers and the second chambers. The configuration of fluid-displacing portions of the pistons conforms substantially to that of the respective bottom walls and the effective cross-sectional area of the second channel need not exceed the maximum cross-sectional area of the path in which the fluid can flow in open position of the valve closure member. This insures that the servomotor reacts without delay in response to opening of the valve closure member and the braking action can be regulated with a high degree of precision. The second channel preferably includes passages provided by flutes in the casing of the control valve.

The novel features which are considered as characteristic of the invention are set forth in particular in the appended claims. The improved servomotor itself, however, both as to its construction and its mode of operation, together with additional features and advantages thereof, will be best understood upon perusal of the following detailed description of certain specific embodiments with reference to the accompanying drawing.

Brief description of the drawing

The single figure is a fragmentary axial sectional view of a fluid pressure servomotor which embodies my invention.

Description of the preferred embodiments

The servomotor shown in the drawing comprises a shell including a stamped cup-shaped rear cylinder or section 1 of sheet metal having at its front or left-hand end an enlarged extension 2 which accommodates a stamped front cylinder or section 3 of sheet metal. The cylinder 3 is fitted into the extension 2 with some radial clearance and the open end of the extension is closed by a front cover 4 having a cylindrical flange 5 whose end face is welded to the end face of the extension 2 by a flat seam shown at 6. The flange 5 is telescoped into the foremost part of the extension 2. The annular shoulder between the rear part of the rear cylinder 1 and its extension 2 is formed with a series of circumferentially spaced protuberances in the form of indentations or dents 7 which hold the front cylinder 3 against axial movement rearwardly, i.e., away from the front cover 4 of the cylinder 1. Similar indentations or protuberances 8 are provided on the cover 4 at the open front end of the front cylinder 3; these indentations 8 extend into the space around a radially inwardly offset portion of the cylindrical flange 5. The indentations 7 abut against the marginal portion of a bottom wall 54 which forms part of the front cylinder 3. The annular channel 9 between the periphery of the front cylinder 3 and the extension 2 of the rear cylinder 1 is open at each of its ends; this channel provides a path for the flow of fluid from the interior of the cylinder 1 into the interior of the cylinder 3 or vice versa.

The rear cylinder 1 accommodates a rear working piston 10 which divides its interior into a pair of power chambers including a front power chamber or vacuum chamber A and a rear or second power chamber B. A second piston 11 divides the interior of the front cylinder 3 into a front power chamber or vacuum chamber A' and a rear or second power chamber B'. A connection 12 installed on the front cover 4 of the cylinder 1 communicates vacuum to the front power chambers A' and A. The source of vacuum is not shown in the drawing. A hollow tubular coupling or hub 13 of sheet metal provides a permanent rigid connection between the pistons 10 and 11. This hub extends through a central opening 14 in the bottom wall 54 of the front cylinder 3. An annular sealing element 15 of elastic material is interposed between the bottom wall 54 and hub 13 in front of the opening 14. The right-hand or rear portion of the hub 13 extends into a sleeve 16 of the piston 10 and is welded thereto by a flat ring-shaped seam 17. The left-hand end portion of the hub 13 is provided with a radially outwardly extending flange 18 which is welded to the adjoining portion of the piston 11. Several radially outwardly extending hollow flutes 19 of the piston 11 provide passages between the front power chamber A' and the interior of the hub 13.

The hub 13 accommodates an axially movable hollow cylindrical member 20 which constitutes the casing of the control valve. This casing 20 is surrounded by an annular sealing element 21 accommodated in a rearwardly extending cylindrical sleeve 22 in the bottom wall 53 of the rear cylinder 1. The casing 20 has several longitudinally extending flutes 23 the rear ends of which extend close to the sealing element 21 when the pistons 10, 11 of the servomotor assume the idle positions shown in the drawing. The flutes 23 provide passages which connect the interior of the hub 13 with the second chamber B of the cylinder 1. The combined cross-sectional area of the flutes 23 is selected in such a way that they do not provide a large dead space and allow for rapid filling of chamber B with a fluid medium. This combined cross-sectional area preferably approximates the maximum area of the path provided by the control valve including the casing 20 in fully open position of a valve closure member 25. The left-hand end portion of the casing 20 is accommodated in the hub 13 and carries an atmospheric valve seat 24 which is normally engaged by the valve closure member 25. The latter is biased to sealing position by a helical valve spring 25a. The valve member 25 resembles a cup and its open right-hand end is connected to a bellows 26 which is carried by an annular projection 27 of a divider or partition 29 provided with apertures 28. A rearwardly extending sleeve 30 of the piston 11 projects with clearance into the atmospheric valve seat 24. The rear end portion 31 of the sleeve constitutes a vacuum valve seat for the valve closure member 25. A post 32 extends axially through the sleeve 30, valve closure member 25 and partition 29 and is affixed to the latter by two split rings 33, 34. The right-hand end portion of the post 32 is of spherical shape and extends into a socket provided in the left-hand end face of a push rod or control rod 35 which is movable axially by an actuating member here shown as a brake pedal 36. A spring 38 operates between a split ring 37 in the casing 20 and a head 39 of the push rod 35 and serves to bias the push rod against the post 32. The left-hand end portion of the post 32 comprises an enlargement or head 40 provided with a circumferential groove 41 for the radially innermost ends of three levers 42. The radially outermost portions of levers 42 are provided with bores 43 for connecting bolts 44 which are installed in the chamber A' and are welded to the left-hand side of the piston 11 in the region substantially midway between the center and the marginal portion of this piston. The axes of bolts 44 are equidistant from the axis of the servomotor. A disk 45 bears against the left-hand sides of the levers 42 under the bias of a strong helical return spring 48 accommodated in the chamber A'. The disk 45 has projections or ribs 46 which bear against the levers 42. Furthermore, the disk 45 has bores which receive portions of the connecting bolts 44 and these bolts are coupled to the disk by split rings 47 with at least some freedom of axial movement. The disk 45 is rigid with a force transmitting member or rod 49 which extends through a central opening 51 provided in the front cover 4 and is fluidtightly surrounded by an annular sealing element 52. The force transmitting member 49 can transmit motion to the piston of a master cylinder in the braking system of an automotive vehicle, not shown. In order to keep the volume of the chambers B and B' to a minimum, the configuration of the fluid-displacing portions of pistons 10, 11 conforms to that of the bottom walls 53, 54 which are of slightly conical shape. The central portion of the bottom wall 54 has an annular portion 55 which bulges into the chamber A to accommodate the flutes 19.

The operation is as follows:

When no pressure is applied against the pedal 36, the braking system is idle and the parts of the servomotor assume the positions shown in the drawing. The connection 12 is coupled to the suction pipe of the internal combustion engine in an automotive vehicle which embodies the braking system. Vacuum is communicated from chamber A' to chamber A via channel 9. Vacuum is also communicated to the chambers B' and B because the valve closure member 25 is spaced from the vacuum valve seat 31 of the sleeve 30 on the front piston 11. Thus, the chamber B' communicates with the chamber A' through a second channel including passages defined by the flutes 19. The flutes 23 of the casing 20 connect the chamber B with the chamber B'. The pistons 10, 11 are held in their right-hand end positions by the return spring 48 in chamber A'. It will be recalled that the hub 13 provides a rigid connection between the pistons 10 and 11. The spring 48 acts upon the disk 45 whose ribs 46 bear against the levers 42 which are coupled to the piston 11 by bolts 44. The levers 42 urge the head 40 of the post 32 against the piston 11 whereby the post 32 maintains the casing 20 in an axial position (with reference to the hub 13) in which the valve closure member 25 bears against the atmospheric valve seat 24.

If the driver decides to depress the pedal 36 by pivoting it in a counterclockwise direction, the push rod 35 displaces the casing 20 in a direction to the left whereby the valve closure member 25 moves into sealing engagement with the vacuum valve seat 31 to seal the chambers B, B' from the chambers A, A'. As the driver continues to depress the pedal 36, the valve closure member 25 is disengaged from the atmospheric valve seat 24 so that atmospheric air rushes into the chambers B, B'. Such air enters through the open right-hand end of the casing 20 and flows through the apertures 28 of the partition 29, around the valve closure member 25, through the passages defined by flutes 19 and through the passages defined by flutes 23. These passages respectively communicate with the chambers B' and B. Since the chambers A, A' remain connected to the suction pipe of the engine (via connection 12 and channel 9), the pistons 10, 11 perform simultaneous working strokes in a direction to the left as viewed in the drawing and cause the return spring 48 to store energy. The force resulting from pressure differential in chambers A, A' and B, B' is added to the force applied against the pedal 36 and is transmitted to the rod 49 which displaces the piston in the master cylinder of the braking system in a sense to produce a braking action. The levers 42 balance the force applied against the pedal 36 with the force produced by pressure differential developing when the chambers B, B' are connected with the atmosphere. When the balance between muscle power and pneumatically produced force is established, the levers 42 (which are moved from their idle positions on depression of the pedal 36) assume a position of equilibrium in which they allow the valve closure member 25 to return into sealing engagement with the atmospheric valve seat 24. Such equilibrium is destroyed when the driver releases the pedal 36. The force which opposes movement of the rod 49 in a direction to the left is compounded with the bias of return spring 48 whereby the inner ends of the levers 42 move the head 40 toward the piston 11 so that the post 32 moves the valve closure member 25 away from the vacuum valve seat 31. This establishes communication between the chambers A, A' and B, B' and the spring 48 is then free to return the pistons 10, 11 to their starting or idle positions.

If desired, the shell including the cylinders 1 and 3 can be further stiffened or reinforced by the provision of longitudinally extending ribs or flutes 60 (one shown by broken lines) in the extension 2. Such flutes 60 bear against and center the cylinder 3 in the extension 2 and at the same time effect a subdivision of the annular channel 9 into a plurality of axially extending channels each of which communicates with the chambers A and A'.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a fluid pressure servomotor, particularly for operating the braking system of a vehicle, a combination comprising a shell including a series of hollow cylinders having bottom portions; a piston reciprocably installed in each of said cylinders and dividing the interior of the respective cylinder into a first and a second chamber, each piston having a fluid-displacing portion of a configuration substantially conforming to that of the respective bottom portion; first channel means defined by at least one of said cylinders to establish communication between said first chambers; hollow coupling means providing a connection betwen said pistons; a member cooperating with said coupling means to define therewith second channel means establishing communication between said second chambers and having a predetermine deffective cross-sectional area; and valve closure means movable between first and second positions to respectively establish and terminate communication betwen said first and second chambers and to provide a path having in said first position thereof a cross-sectional area which approximates said predetermined area, said member forming a casing for said valve closure means and being reciprocable in said coupling means, said second channel means extending between said casing and said coupling means.

2. A combination as defined in claim 1, wherein said casing comprises a sleeve having longitudinally extending flutes providing passages which form part of said second channel means.

3. A combination as defined in claim 2, wherein said valve closure means is reciprocably received in said sleeve.

4. A combination as defined in claim 3, wherein said sleeve comprises a seat which is engaged by said valve closure means in said second position thereof to seal said second chambers from the atmosphere.

5. A combination as defined in claim 4, wherein said pistons include a front piston and a rear piston and said seat is adjacent to said front piston.

6. A combination as defined in claim 5, wherein said front piston comprises a second seat which is engaged by said valve closure means in said second position thereof to seal said first chambers from said second chambers and to simultaneously connect said second chambers with the atmosphere.

7. In a fluid pressure servomotor, particularly for operating the braking system of a vehicle, a combination comprising a shell including a series of hollow cylinders having bottom portions, one of said cylinders including an extension receiving another of said cylinders and said extension comprising inwardly extending protuberances at one axial end of said other cylinder; a closure for said one cylinder, said closure having outwardly extending protuberances at the other axial end of said other cylinder; a piston reciprocably installed in each of said cylinders and dividing the interior of the respective cylinder into a first and a second chamber, each piston having a fluid-displacing portion of a configuration substantially conforming to that of the respective bottom portion; first channel means defined by at least one of said cylinders to establish communication between said first chambers; hollow coupling means providing a connection between said pistons; a member cooperating with said coupling means to define therewith second channel means establishing communication between said second chambers and having a predetermined effective cross-sectional area; and valve closure means movable between first and second positions to respectively establish and terminate communication between said first and second chambers and to provide a path having in said first position thereof a cross-sectional area which approximates said predetermined area.

8. In a fluid pressure servomotor, particularly for operating the braking system of a vehicle, a combination comprising a shell including a series of hollow cylinders having bottom portions, one of said cylinders comprising an extension accommodating another of said cylinders and having substantially axially extending flutes which center said other cylinder in said extension; a piston reciprocably installed in each of said cylinders and dividing the interior of the respective cylinder into a first and a second chamber, each piston having a fluid-displacing portion of a configuration substantially conforming to that of the respective bottom portion; first channel means defined by at least one of said cylinders to establish communication between said first chambers; hollow coupling means providing a connection between said pistons; a member cooperating with said coupling means to define therewith second channel means establishing communication between said second chambers and having a predetermined effective cross-sectional area; and valve closure means movable betwen first and second positions to respectively establish and terminate communication between said first and second chambers and to provide a path having in said first position thereof a cross-sectional area which approximates said predetermined area.

9. A combination as defined in claim 8, wherein said one cylinder comprises indentations to hold said other cylinder against axial movement in said extension, said indentations being provided at least at one axial end of said other cylinder.

10. In a fluid pressure servomotor, particularly for operating the braking system of a vehicle, a combination comprising a shell including a series of hollow cylinders having bottom portions; a piston reciprocably installed in each of said cylinders and dividing the interior of the respective cylinder into a constant pressure chamber and a variable pressure chamber, one of said constant pressure chambers being connected to a source of vacuum and each piston having a fluid-displacing portion of a configuration substantially conforming to that of the respective bottom portion, said fluid-displacing portions and the corresponding bottom portions defining the respective variable pressure chambers; first channel means defined by at least the periphery of one of said cylinders to establish communication between said constant pressure chambers; hollow coupling means providing a connection between said pistons; a member cooperating with said coupling means to define therewith second channel means establishing communication between said variable pressure chambers and having a predetermined effective cross-sectional area; and valve closure means movable between first and second positions to respectively establish and terminate communication between said constant pressure chambers and said variable pressure chambers and to provide a path having in said first position thereof a cross-sectional area which approximates said predetermined area.

References Cited
UNITED STATES PATENTS

| | | | |
|---|---|---|---|
| 2,980,068 | 4/1961 | Stelzer | 92—48 |
| 3,013,536 | 12/1961 | Cripe | 92—48 |
| 3,103,855 | 9/1963 | Hager et al. | 92—48 |
| 3,292,502 | 12/1966 | Myers et al. | 92—48 |

PAUL E. MASLOUSKY, *Primary Examiner.*

U.S. Cl. X.R.

91—411; 92—48, 110, 113; 137—596.1, 627.5